Patented Nov. 8, 1932

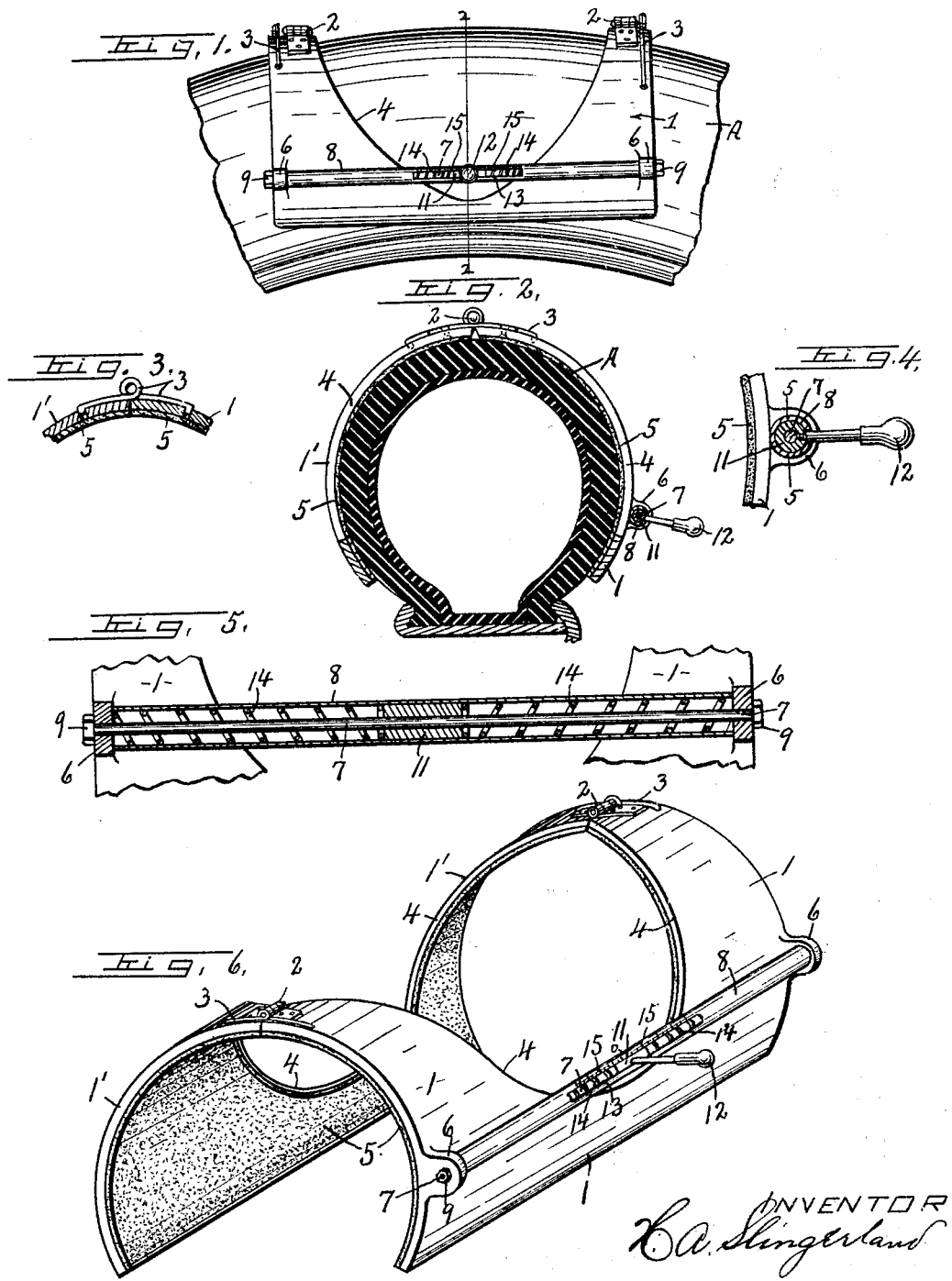

1,886,599

UNITED STATES PATENT OFFICE

HENRY A. SLINGERLAND, OF SYRACUSE, NEW YORK

BRAKE TESTING DEVICE

Application filed December 10, 1927. Serial No. 239,126.

This invention relates to a brake-testing device for motor vehicle wheels having pneumatic or equivalent resilient tires and involves the use of a clamp adapted to be placed by hand over and upon the periphery of the tire for frictional engagement therewith, and having a handle movable relatively thereto in the direction of the length of the tire together with means for measuring the resistance to the movement of said handle due to the setting of the brakes, so that when the measured force required to overcome the brake-resistance of one of the traction wheels becomes known, by the reading of the measurement upon said device, the latter may be similarly applied to the other traction wheel and its brake resistance adjusted until the measured force necessary to overcome said brake resistance corresponds to the reading given for the previous test.

The main object is to provide a simple and comparatively inexpensive device of this character for use in garages and other public service stations or by individual car owners, to easily and quickly determine whether or not the brake resistance of two or more vehicle wheels is substantially equal, and if not to enable the operator to effect the necessary adjustments of the brakes to equalize said resistance.

Another object is to provide the device with opposed jaws constructed so as to conform as closely as possible to the contour of the tire to which it is to be applied, and spring pressed toward each other to automatically establish a firm friction grip with the tire when applied thereto for brake-testing purposes.

Another object is to mount the relatively movable handle upon the tire clamp in such manner that it is easily accessible for operation at the outside of the wheel when applied to different wheels.

A further object is to provide yielding means for normally holding the handle in a zero position and permitting it to be operated in either direction to give the required reading for the brake resistance when moved in either direction from its normal or zero position.

Other objects and uses relating to specific parts of the brake-testing device will be brought out in the following description.

In the drawing:—

Figure 1 is a side elevation of a brake-testing device embodying the features of my invention operatively mounted upon a portion of a tire.

Figure 2 is an enlarged transverse sectional view taken on line 2—2, Figure 1.

Figure 3 is an enlarged detail sectional view taken in the plane of line 3—3, Figure 1 showing more particularly the spring connections between the relatively movable jaws of the tire clamping device.

Figure 4 is a further enlarged transverse sectional view of the guide tube for the handle operated plunger taken also in the plane of line 2—2, Figure 1.

Figure 5 is a longitudinal sectional view of the guide tube for the handle operated plunger and springs taken in the plane of line 5—5, Figure 4.

Figure 6 is a perspective view of the detached brake-testing device.

As illustrated this brake-testing device comprises a pair of opposed jaws or clamping members —1— and —1'— of concavo-convex cross section arranged edge to edge and having their meeting edges hinged to each other at —2— to permit their opposite longitudinal edges to be moved toward and from each other, but are normally urged toward each other by springs —3— adjacent the hinges —2— and preferably coiled around the pintles of the corresponding hinges.

The free edges of the jaws —1— are continuous from end to end but the major portions thereof between the ends are cut away at —4— so that the ends of the meeting edges are relatively short longitudinally to rest upon the tread of the tire, while the remaining portions of the jaws extend circumferentially around the opposite end faces of the tire to frictionally grip the same.

The object in cutting away the major portions of the jaws —1— and —1'— between the ends thereof is to allow portions of the treads of the tire to project therethrough as may be required for tires of different diameters, and thereby to assure contact of the major portions of the free edges of the jaws with the opposite faces of the tire and frictional gripping engagement therewith as the jaws are forced toward each other by the springs —3—.

This gripping engagement of the jaws with the tire is materially increased by providing the inner faces of said jaws with linings —5— of soft rubber or equivalent material adhesively or otherwise secured to the jaws to form a unitary part thereof.

The jaws —1— and —1'— exclusive of their resilient linings —5— may be made of heavy sheet metal or cast metal molded to the desired form and size, the length of the jaws being equal and relatively short as compared with the circumferential length of the tire, but as previously stated these jaws are curved transversely to conform more or less closely to the transverse curvature of the tire to which they are to be applied. As illustrated the transverse width of the combined jaws 1 and 2 is slightly greater than a half circle and therefore the transverse width of each jaw is slightly greater than a quarter circle which enables them to grip corresponding transversed areas of opposite sides of the tire.

The jaws —1— and —1'— are substantially identical in construction and may be made in the same mold or by the same dies, and afterward coupled together by the hinges —2— to permit their relatively transverse movement when placing the device over and upon the tire.

One of the jaws as —1— is however provided with outturned ears or lugs —6— adjacent the ends thereof and preferably closer to and in a line parallel with the free edge of said jaw for receiving and supporting a guide bolt —7— and a tubular guide —8—, which latter is interposed between the lugs —6— to abut against the inner faces thereof and surrounds the bolt —7— concentric therewith and mainly in spaced relation thereto.

The guide bolt —7— is provided with shoulders —9— abutting against the outer end faces of the lugs —6— to hold the bolt against axial movement, but it is to be understood, however, that one of the shoulders and adjacent end of the bolt may be threaded to permit tightening of the bolt in the lugs —6— and removal of the same therefrom when desired.

A plunger —11— is mounted between the intermediate portion of the bolt —7— within the tube —8— for reciprocatory movement lengthwise thereof, and is provided with a handle —12— projecting outwardly and radially therefrom through a lengthwise slot —13— in the outer side of the tube, whereby the plunger may be reciprocated in opposite directions within the tube and upon the guide bolt —7—.

The plunger —11— and its handle —12— are yieldingly held in a medial or zero position relatively to the rod —7— and tube —8— by opposed coiled springs —14— which surround the rod within the tube, and have their inner ends abutting against opposite ends of the plunger —11— and their outer ends abutting against the inner faces of the lugs —6— as shown more clearly in Figure 5. These springs are placed under substantially equal compression and are relatively stiff or of high resistance to hold the plunger —11— at its zero or starting position.

The shank of the handle —12— near its junction with the central portion of the plunger —11— serves as a pointer movable with said plunger along graduated scales —15— extending in opposite directions from the zero graduation —0— to indicate the amount of movement of the plunger along the scale when testing the brakes of a wheel to which the testing device has been applied.

The graduations of both scales —15— indicate progressively increasing values from the zero graduation, said values representing pounds (lbs.) pull upon the plunger in either direction.

The purpose in placing the tube —8— and plunger —11— nearest the free edge of one of the jaws as —1— is to bring the handle —12— into more convenient position for operation of the plunger from the outside of the wheel to which the device has been applied for brake-testing purposes, it being understood that the same device may be used on wheels at opposite sides of the vehicle with the same degree of convenience of operation of the plunger —11—.

*Operation*

When using this device for testing the brakes of the vehicle wheels the axle carrying the wheels is jacked up sufficiently to cause the wheels to clear the pavement or floor, and to allow said wheels to be turned on their respective bearings after which the brakes will be set or applied to produce more or less resistance to the rotation of the wheels.

The jaws —1— and —1'— of the brake-testing device are then spread apart against the action of their retracting springs —3—, a sufficient distance to permit them to be placed over and upon opposite sides of the tire of one of the wheels to which the brake has been previously applied.

The jaws —1— and —1'— are then allowed to close against the adjacent faces of the tire by the action of the spring —3— to firmly grip said tire and to hold the testing device against circumferential movement relatively to the tire when force is applied to the handle —12— and plunger —11— in either direction. In making the test, the operator engages the handle —12— and pulls the same in one direction thereby compressing the spring —14— at the adjacent end of the plunger.

This movement of the plunger is transmitted through the jaws —1— and —1'— to the tire as —A—tending to move the latter in the same direction, and is continued until the resistance of the brake is overcome at which time the position of the plunger along the guide tube is indicated by the scale —15— which incidently indicates the amount of force applied to the rotation of the wheel necessary to overcome the resistance of the brake.

The testing device is then removed from the wheel thus tested and applied to its companion wheel at the other side of the vehicle in the same manner as previously explained after which the plunger —11— is operated by its handle —12— along the guide tube —8— and scale —15— until the force applied to the last mentioned wheel overcomes the resistance of the brake of that particular wheel, and if the force indicated on the scale —15— is the same or substantially the same as that shown by the test of the first-named wheel, it indicates that the brake resistances of both wheels are substantially the same and therefore the brakes will be applied with equal force to their respective wheels.

On the other hand if the reading on the scale —15— during the testing of the brake resistance of the second-named wheel differs from that of the first-named wheel suitable adjustment is made until the brake resistances of both wheels are substantially alike.

When the test of both wheels show equal brake resistance the device is removed and laid aside for further use.

It will now be understood that this brake-testing device is particularly simple and expeditious and avoids the usual practice of making road tests to determine the force of application of the companion brakes.

What I claim is:

1. In a device for testing the brakes of motor vehicle wheels having resilient tires, a clamp having opposed jaws spring-pressed toward each other for frictionally engaging opposite sides of the tire, a guide mounted on one of the jaws, a plunger movable along the guide, a spring for holding the plunger in a normal position, means operable at will for moving the plunger against the action of said spring, and means for indicating the amount of movement of the plunger from its normal position.

2. In a device for testing the brakes of motor vehicle wheels having resilient tires, a pair of pivotally connected elongated jaws of concavo-convex cross-section spring pressed toward each other for engaging opposite sides of the tire, a lengthwise guide on one of the jaws, a plunger movable along said guide, a spring normally holding the plunger in a normal position, means operable at will for moving the plunger against the action of the spring, and means for indicating the amount of movement of the plunger from its normal position.

In witness whereof I have hereunto set my hand this 28th day of November 1927.

HENRY A. SLINGERLAND.